Jan. 5, 1954 J. B. BRENNAN 2,665,329
CLOSURE AND TERMINAL SEAL FOR ELECTROLYTIC DEVICES
Filed March 11, 1947 3 Sheets-Sheet 1
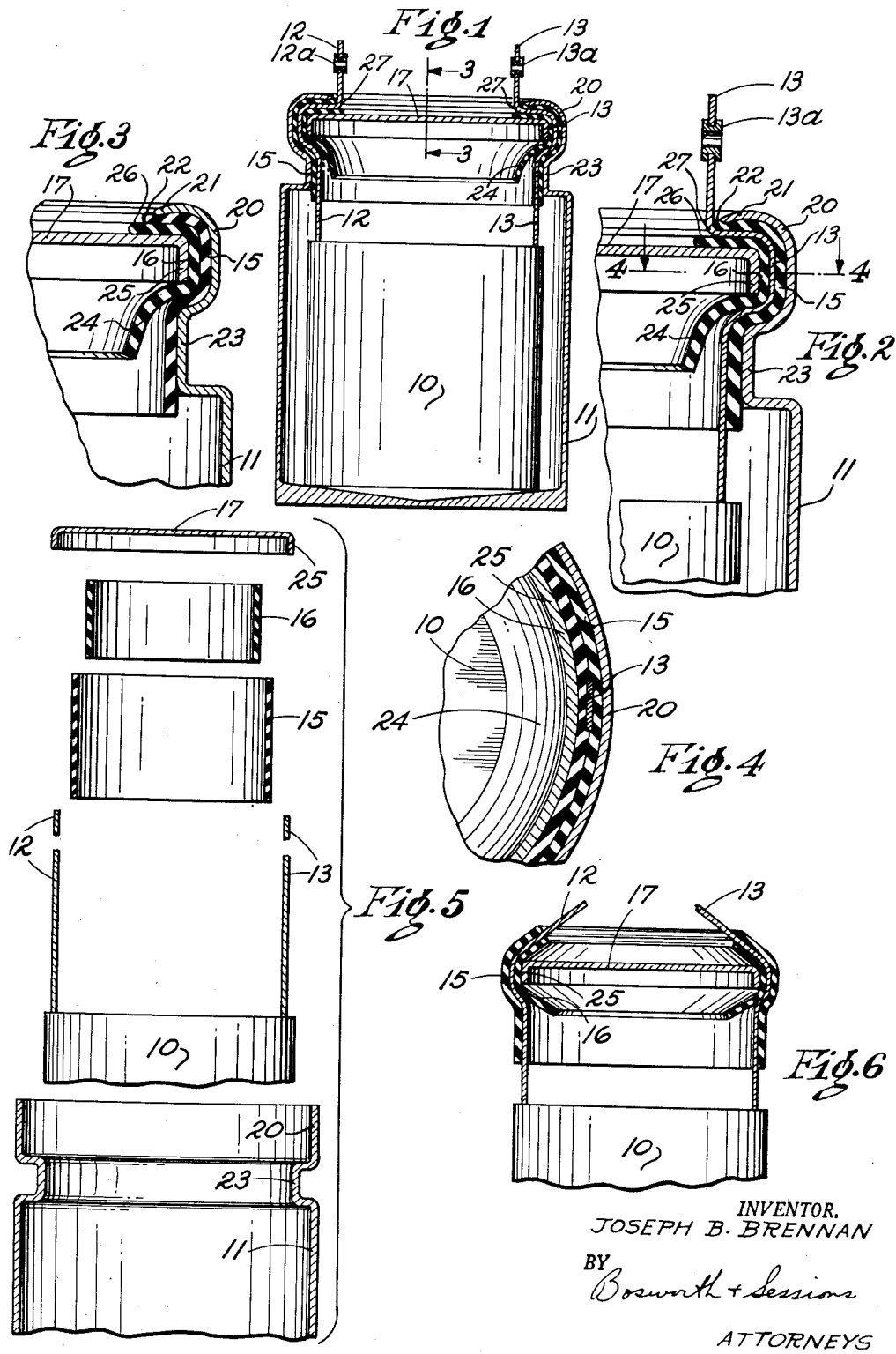
INVENTOR.
JOSEPH B. BRENNAN
BY Bosworth + Sessions
ATTORNEYS Jan. 5, 1954          J. B. BRENNAN          2,665,329
CLOSURE AND TERMINAL SEAL FOR ELECTROLYTIC DEVICES
Filed March 11, 1947          3 Sheets-Sheet 2
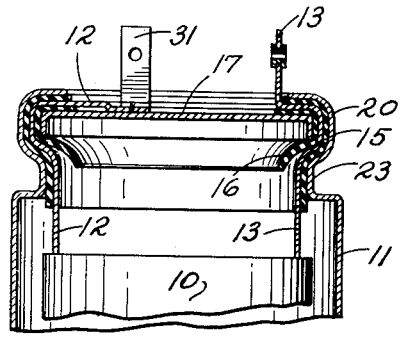
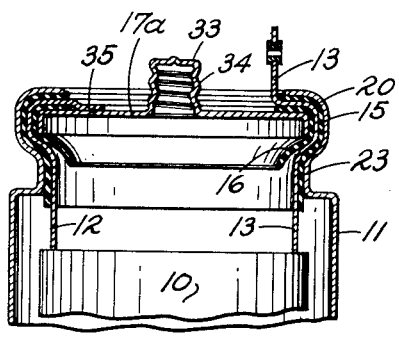
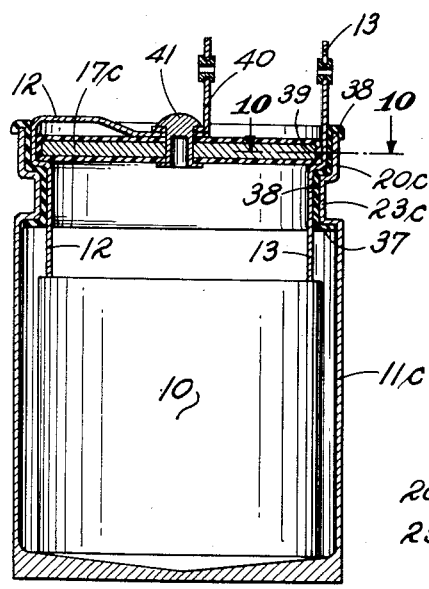
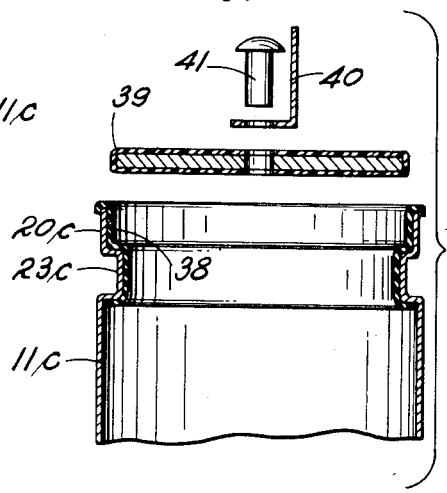
INVENTOR.
JOSEPH B. BRENNAN
BY
Broworth & Sessions
ATTORNEYS Jan. 5, 1954    J. B. BRENNAN    2,665,329
CLOSURE AND TERMINAL SEAL FOR ELECTROLYTIC DEVICES
Filed March 11, 1947    3 Sheets-Sheet 3

INVENTOR.
JOSEPH B. BRENNAN
BY
Bosworth & Sessions
ATTORNEYS

Patented Jan. 5, 1954

2,665,329

UNITED STATES PATENT OFFICE 2,665,329

CLOSURE AND TERMINAL SEAL FOR ELECTROLYTIC DEVICES

Joseph B. Brennan, Bratenahl, Ohio, assignor to Everett D. McCurdy, trustee

Application March 11, 1947, Serial No. 733,970

8 Claims. (Cl. 174—52)

This invention relates to electrolytic devices and more particularly to closure and terminal constructions for electrolytic devices. The invention is described herein in connection with electrolytic condensers and the like; it is to be understood, however, that the invention is useful in connection with various other electrolytic devices.

Electrolytic condensers ordinarily comprise a container within which the electrodes or plates of the condenser are disposed, the container serving to retain the electrolyte required for the operation of the condenser; the electrolyte ordinarily is either a liquid or a viscous paste. In order to prevent loss of the electrolyte, it is necessary that the container be sealed, and it is also essential that one or more terminals or leads be extended from the electrodes within the container to the exterior of the container. Heretofore, the problem of providing closures and supports for the leads or terminals of condensers has not been solved in satisfactory fashion because of the difficulty of providing effective closures and seals which can be manufactured and assembled at low cost. It is, accordingly, a general object of the present invention to provide a closure and terminal support construction for electrolytic devices by means of which the container of the device can be effectively and permanently sealed against leakage of electrolyte and which can be manufactured at a substantial saving in cost as compared to the cost of prior types of closure assemblies.

Figure 12:
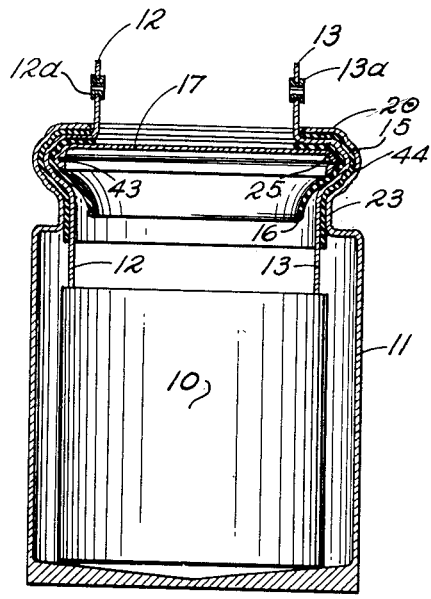
Figure 13:
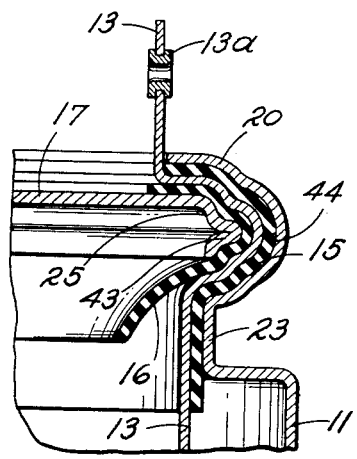
Figure 14:
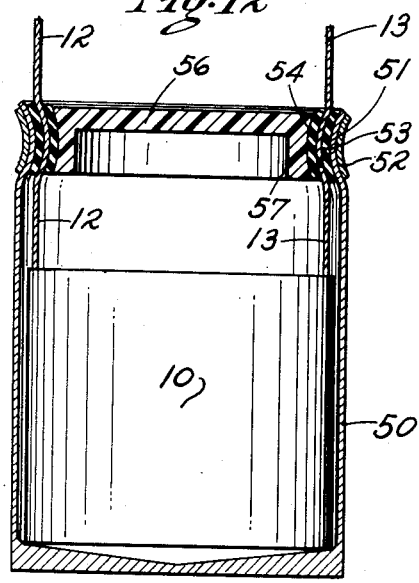
Figure 15:
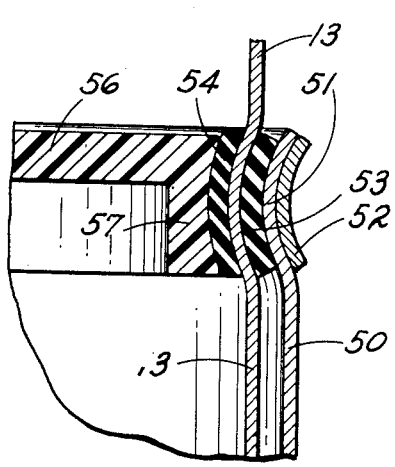

Further objects and advantages of the invention will become apparent from the following description of preferred forms thereof, reference being made to the accompanying drawings, in which Figure 1 is a vertical sectional view through an electrolytic condenser of the paste type embodying one form of my invention; Figure 2 is an enlarged sectional detail taken of the condenser shown in Figure 1; Figure 3 is an enlarged sectional detail taken in a plane at right angles to the plane of Figure 2, and along the line indicated by the line 3—3 of Figure 1; Figure 4 is a fragmentary horizontal section as indicated by the line 4—4 of Figure 2; Figure 5 is a view illustrating the component parts of the condenser of Figure 1; Figure 6 is a sectional view illustrating a sub-assembly of all of the parts except the container; Figure 7 is a vertical sectional view of a slightly modified form of closure and terminal support; Figure 8 is a similar view showing a further modification in the mounting means for the condenser; Figure 9 is a similar section of still a further modification; Figure 10 is a horizontal section taken along the line 10—10 of Figure 9; Figure 11 is a view illustrating the components of the closure construction of Figure 9 before the assembly has been completed; Figure 12 is a vertical sectional view of a further modification of the invention; Figure 13 is an enlarged sectional detail of the modification shown in Figure 12; Figure 14 is a vertical sectional view of another modification; and Figure 15 is an enlarged sectional detail of the device shown in Figure 14.

Briefly, according to a preferred form of my invention, I provide an effective seal and closure for the container for an electrolytic device and a support for the terminals thereof by disposing within the open end of the container two members composed of resilient insulating material such as rubber (the term "rubber" as used herein includes both natural and synthetic rubber and rubber-like materials) and having opposed mating surfaces. One or more terminal members, preferably in the form of small wires or strips of thin metallic foil, extend from the exterior to the interior of the container between the opposed surfaces, and the resilient members are deformed to admit the terminal and to seal against the terminal and each other. In preferred forms of the invention, the resilient insulating members are annular in form with one member disposed within the other, but it will be appreciated that the members may take other shapes without departing from the invention.

Referring to Figures 1 to 6 of the drawings, a condenser embodying a preferred form of my invention may comprise an electrode assembly 10 disposed within a container 11, the container being a thin-wall open-ended cup or can composed of aluminum or other suitable material. The electrode or plate assembly may be of any desired construction; as this assembly, per se, forms no part of the present invention, it will not be described further herein. Terminals or leads 12 and 13 project upwardly from the assembly 10 and extend to the exterior of the container where they are provided with eyelets 12a and 13a to facilitate soldering of wires thereto. The terminals, which preferably are composed of narrow strips of thin (0.030" in thickness, for example) aluminum foil, extend between resilient annular sealing rings 15 and 16, the inner ring 16 being supported by a flanged disk 17 which also may be composed of aluminum, and the sealing members being held in sealing engagement with the container, with the terminal members, with each other and with the inner disk 17 by pressure exerted on the outer sealing member 15 by the inwardly spun or crimped portion 20 of the container 11. The sealing rings may be composed of any suitable resilient insulating material which will not contaminate, or be damaged by, the electrolyte. Rubber of the sort used in ordinary small rubber bands is satisfactory. Where the terminals are 0.030" thick, sealing members having a normal thickness of about 1/16", for example, are satisfactory. The thickness is not critical so long as there is sufficient resilience to permit the terminals to be embedded in and sealed against the members.

As shown in Figures 1 and 2, the compression of the resilient sealing members exerted between the upper end of the container 11 and the disk 17 is sufficient securely to seal the members against the container and disk, respectively, and to seal the intermediate surfaces of the members against the terminals. As shown in Figures 3 and 4, the outer surface of the inner member 16 seals against the inner surface of the outer member 15 in the zones where the terminal members do not intervene. Also, as shown particularly in Figure 4, the material of the rings 15 and 16 is soft and resilient enough to permit the terminal members to become embedded therein with the resilient members sealing not only against the lateral faces of the terminals, but also against the narrow edges thereof, thus effectively sealing the container against leakage.

The rubber rings also effectively support the terminals 12 and 13 and hold them against movement with respect to the container. The outer rubber ring 15 extends inwardly beyond the upper edge 21 of the container as at 22 and also below the inwardly extending shoulder 23, thus insulating the terminals from the container; the inner ring 16 in similar fashion extends inwardly and downwardly as at 24 well beyond the flange 25 of the disk 17, and inwardly along the upper surface of the disk 17, as at 26, beyond the inner edges 21 and 22 of the container and the outer ring 15, respectively, and beyond the bends 27 of the terminals, thus insulating the terminals from the disk 17. Of course, if the disk is made of insulating material rather than aluminum, such insulation is not necessary.

The manner in which the condenser is assembled and the component parts thereof are illustrated in Figures 5 and 6. As shown in Figure 5, the container 11 initially has formed in it the inwardly extending shoulder 23 disposed a slight distance beneath the open end of the container. The upper portion 20 in the container as originally formed is cylindrical and may be of the same diameter as the body of the container. The condenser assembly 10 may thus be readily inserted into the container.

The closure and terminal support assembly is made up of the rings 15 and 16 and the flanged disk 17. As shown in Figure 5, the rings 15 and 16 initially are simple resilient rubber rings or bands of uniform wall thickness and generally cylindrical shape. The ring 15 is initially of slightly smaller diameter than the outside diameter of the disk 17, and the ring 16 is of somewhat smaller diameter than ring 15. Thus, both rings must be stretched around the periphery of the disk 17; when so stretched, the elasticity of the material causes the rings to assume a channel or C-shaped section such as that shown in Figure 6.

In assembling the parts, the ring 16 is stretched over the disk 17, then the terminals 12 and 13 are positioned in contact with the outer surface of the ring 16, and thereafter the ring 15 is stretched over these parts to produce the subassembly shown in Figure 6, with the inwardly extending portions of the rings forming skirts which insulate the terminals against accidental contact with each other or with the container or the disk. Sub-assemblies, such as shown in Figure 6, are convenient inasmuch as the electrode assembly 10 may be subjected to the customary aging operation before the electrode assembly is placed within the container. A number of such sub-assemblies may be aged simultaneously by connecting the terminals thereof to suitable sources of current and immersing the electrode assemblies 10 in a suitable aging electrolyte contained in a tank. After the aging operation has been completed, the sub-assemblies may be assembled with the containers 11 without requiring that the electrode assemblies be touched, inasmuch as they are supported by the terminals 12 and 13 which are disposed between the resilient members 15 and 16.

To complete the assembly of the condenser, the subassembly is placed in the container by first inserting the electrode assembly 10 into the container and then pushing the closure down into the open-ended portion 20 of the container with the ring 16 in engagement with the inner surface of the portion 20. The shoulder 23 furnishes a stop, limiting the inward movement of the sub-assembly, holding the parts in the correct position. Thereafter, the assembly is completed by spinning, rolling or crimping the upper portion of the container inwardly into the position shown in Figures 1, 2 and 3. This operation reduces the diameter of the upper portion of the container and thereby compresses the material of the rings 15 and 16, creating the necessary seals between the outer ring and the inner surface of the container, between the contacting surfaces of the rings, between the rings and the terminal members and between the inner ring and the flanged disk 17. The compression exerted by the deforming operation insures that an adequate seal will be produced with the terminals embedded in the rings and thus firmly held in position. Thereafter, it is only necessary to bend the terminals upwardly or into any other desired position to complete the assembly.

In Figure 7 of the drawings, a modified form of construction is shown in which the terminal 12 is secured as by welding to the disk 17, and a connector 31 is simultaneously welded to the end of the terminal thereby firmly securing the connector to the disk. The remaining parts of the assembly of Figure 7 are identical with the parts shown in Figures 1 to 5 and are given the same reference characters. In this modification, the connector 31 may be used to mount the condenser if desired.

Figure 8 shows another modified form of the invention in which the disk 17a is provided with a central projection 33 which is threaded as at 34 to provide for mounting the condenser in a threaded socket. Here the terminal 12 is welded as at 35 to the disk 17a, and thus the screw threaded projection 33 can be employed as one of the connections between the condenser and an external circuit.

In Figures 9, 10 and 11, another modification of the invention is illustrated in which the resilient sealing members are formed by coating the upper end of the container and the central disk with a rubber sealing material which dries and cures to provide the sealing members. As shown in the drawings, the container 11c may be identical in all material respects with the container 11 heretofore described, except that the upper portion 20c thereof is not spun inwardly and is shorter than the portion 20 of the container 11. In this form of the invention, the outer resilient member 36, however, consists of a coating of rubber applied to the inner surface of the upper portion of the container and preferably covering the underside of the inwardly extending shoulder 23c as at 37 and extending over the upper edge of the container as indicated at 38. This material may be the well known rubber composition employed widely in the sealing of food containers at the present time, and is thick enough (1/16" for example) so that its resilience can compensate for any reasonable inaccuracies in the parts and also enable the terminal members 12 and 13 to be embedded therein. In this modification, the central disk 17c, which may be composed of a rigid plastic or of metal, is shown as being composed of thicker material, rather than having a flange as in the previous modification, and the inner resilient member consists of a coating 39 which preferably extends over all of the surfaces of the disk.

The disk 17c and the coating 39 are dimensioned with respect to the container 11c and the coating 38 so that the coatings are firmly compressed when the coated disk is pressed into the coated end of the container. As shown in Figure 10, this operation results in the embedding of the terminals in the resilient members formed by the coatings, and the sealing of the coatings against each other and against the terminals in the manner described in connection with the previous modifications. No deformation of upper portion 20c of the container is required to make the seal in this modification, but it will be evident that resilient members produced by coating may be employed with constructions wherein the container is deformed to compress the members and to lock the closure in place.

In this form of the invention, the terminal 12 and the mounting member 40 are secured together and to the disk 17c by a rivet 41. The riveting operation preferably is carried out after the coating 39 is applied to the member 17c. Hence, the coating material functions to make a leak-proof seal between the rivet and the disk 17c. The component parts making up this seal are illustrated in Figure 10 prior to assembly but after the disk and the upper portion of the container have been coated with the rubber-like material which constitutes the resilient members 38 and 39.

A further slightly modified form of the invention is shown in Figures 12 and 13. This modification is similar in all essential respects to the form of the invention shown in Figure 1, and the same reference characters have been employed to indicate corresponding parts, except that the flange 25 of the member 17 is provided with an outwardly extending annular rib or bead 43 which is disposed adjacent correspondingly outwardly extending groove 44 formed in the upper portion 20 of the container when it is rolled, spun or crimped inwardly. The bead 43 and groove 44 cooperate to further distort the sealing members 15 and 16 and the terminals 12 and 13, providing a more secure interlock between the parts and giving a longer path between the sealing surfaces, thus making it more difficult for any leakage to take place between the contacting surfaces of the members 15 and 16 or along the surfaces of the terminals 12 and 13.

Figures 14 and 15 illustrate an adaptation of my invention to a container embodying a seal of the general type described and claimed in my Patent No. 2,290,163, issued July 21, 1942. In this modification, the container 50 is composed of a material, such as a thin plastic or light gage aluminum, which of itself does not have sufficient strength to exert the necessary pressure on the resilient material to provide a seal. Here the upper end of the container 50 is deformed inwardly as at 51 by a metallic ring 52 which is initially cylindrical and of substantially the same inner diameter as the exterior diameter of the container 50 and which is deformed into the arcuate shape shown and contracted against the container to deform the container inwardly as at 51, thus compressing the rubber seal rings 53 and 54 between which the terminals 12 and 13 extend. In this modification, the inner supporting disk 56 is also shown as being composed of a plastic material such as phenol-formaldehyde plastic or the like, having an arcuate outer surface on the flange 57. Thus, the sealing members 53 and 54 do not have to insulate the terminals from either the container or the disk 56. Obviously, the members 53 and 54 can consist of rubber rings, or if desired, they may be formed by coating the inner surface of the container 50 and the outer periphery of the disk 56 in the manner described in connection with Figures 9, 10 and 11.

It will be observed that in all of the modifications of the invention, thin terminal members are disposed between two resilient mating surfaces. The resilient surfaces are not shaped to receive the terminals, but rather the terminals are embedded in the surfaces when the assembly operation is carried out. The embedding of the terminals into the two resilient surfaces insures the production of an adequate seal and makes it unnecessary to locate the terminals in any particular place with respect to the sealing members. Also, in each of the preferred forms, the provision of a relatively rigid disk within the sealing members, which supports the resilient sealing members against the compressive forces exerted upon them, results in the automatic maintenance of the correct sealing pressures under varying temperature conditions. This result is brought about by the fact that any loss in sealing pressure which might result by reason of expansion of the container upon heating, is substantially compensated for by the expansion of the supporting disk within the inner resilient member.

From the foregoing description of preferred forms of my invention, it will be evident that I have provided effective closures and terminal supports which are particularly adapted for use with electrolytic condensers and other similar electrolytic devices. My closure and terminal support assemblies will effectively prevent leakage of electrolyte and securely retain the terminal members against displacement. The component parts of my assemblies are inexpensive, and the assembly operations may be carried out rapidly and efficiently whereby the finished product can be produced at reasonable cost and at a fraction of the cost of closure and terminal assemblies presently employed.

The invention lends itself to ready modifica-

I claim:

1. A closure and terminal support for an electrolytic device, said closure and support comprising two concentric sealing members composed of resilient insulating material disposed one within the other and having continuous contacting annular surfaces, a rigid member for supporting the inner sealing member against pressure exerted upon it by the outer sealing member, a plurality of metallic terminal members extending between said surfaces of the interior to the exterior of said container at spaced points on the periphery of the inner of the members, and means for compressing the outer member against the inner member to create a seal directly between said members in the regions between said terminals, and between said members and said terminals.

2. A closure and terminal support for an electrolytic device having an open-ended container, said closure and support comprising a rigid disk-like member disposed within the open end of the container, two members composed of resilient insulating material disposed one within the other and having annular complementary mating surfaces, the inner of said resilient members engaging and being supported by the periphery of said rigid disk-like member against the pressure exerted by the outer member and the outer of said resilient members engaging and being supported by the interior surface of the open end of said container, a metallic terminal member extending between said surfaces from the interior to the exterior of said container, said terminal member being embedded in said resilient members and said resilient members being directly in contact with each other on either side of said terminal member, the mating surfaces of said resilient members being in sealing engagement with each other and with said terminal.

3. The combination defined in claim 2, wherein the resilient members consist of coatings of rubber compositions adhering to the inner surface of said container and the peripheral surface of said disk-like member, respectively.

4. The combination defined in claim 3, wherein a plurality of terminal members are provided at spaced points around the periphery of the inner resilient member, one of said terminals being secured to the exterior of said disk-like member and said disk-like member being provided with means for mounting the device.

5. The combination defined in claim 2, wherein the disk-like member is provided with a screw-threaded projection for mounting the device.

6. The combination defined in claim 2 wherein a plurality of terminal members are provided at spaced points around the periphery of the inner resilient member, at least one of said terminals being secured to the exterior of said disc-like member and said disc-like member being provided with means for mounting the device.

7. In an electrolytic device having an open-ended container, a closure for said container comprising two tubular sealing members composed of resilient insulating material disposed one laterally within the other within the open end of said container and having continuous opposed complementary mating contacting surfaces with portions of the mating surface of one member in direct sealing contacting engagement with portions of the mating surface of the other member, means for supporting the mating surface of the inner of said sealing members against external transverse pressure and a terminal member comprising a metallic conductor extending from the exterior to the interior of said container and extending between portions only of said opposed surfaces, means for applying external transverse pressure to the other sealing member to urge said opposed surfaces together to seal against said terminal and to seal against each other in the regions where the surfaces engage each other rather than the terminal, and a separate rigid member disposed within the inner of said sealing members to support the same against external transverse pressure.

8. A closure and terminal support for an electrolytic device having an open-ended tubular metallic container, said closure and support comprising two sealing members composed of resilient insulating material disposed one within the other and having annular mating surfaces, with portions of the mating surface of one member in direct sealing contacting engagement with portions of the mating surface of the other member, means for supporting the mating surface of the inner of said members against external radial pressure, a plurality of metallic terminal members extending between said surfaces from the interior to the exterior of said container at spaced points on the periphery of the inner member, the outer member engaging the inner surface of the tubular container adjacent the open end of the container, said container having an inwardly extending portion to provide a support for said sealing members and limiting their movement into the container, the wall of said container adjacent the open end of the container being deformed inwardly to compress the outer member against the inner member to create a seal between the direct contacting portions of said members and between other portions of said members and said terminals.

JOSEPH B. BRENNAN.

References Cited in the file of this patent

UNITED STATES PATENTS

| Number | Name | Date |
| --- | --- | --- |
| 1,910,426 | Courtright | May 23, 1933 |
| 2,144,959 | Blackburn | Jan. 24, 1939 |
| 2,213,209 | De Lange et al. | Sept. 3, 1940 |
| 2,264,900 | Georgiev | Dec. 2, 1941 |
| 2,267,717 | Brennan | Dec. 30, 1941 |
| 2,445,719 | Sylvester | July 20, 1948 |

FOREIGN PATENTS

| Number | Country | Date |
| --- | --- | --- |
| 578,240 | Great Britain | June 20, 1946 |